(12) United States Patent
Resch

(10) Patent No.: US 12,527,243 B2
(45) Date of Patent: Jan. 20, 2026

(54) METHOD FOR CULTIVATING ROW CROPS

(71) Applicant: Amazonen-Werke H. Dreyer SE & Co. KG, Hasbergen (DE)

(72) Inventor: Rainer Resch, Hagen a TW (DE)

(73) Assignee: Amazonen-Werke H. Dreyer SE & Co. KG, Hasbergen (DE)

( * ) Notice: Subject to any disclaimer, the term of this patent is extended or adjusted under 35 U.S.C. 154(b) by 163 days.

(21) Appl. No.: 18/007,837

(22) PCT Filed: May 25, 2021

(86) PCT No.: PCT/EP2021/063782
§ 371 (c)(1),
(2) Date: Dec. 2, 2022

(87) PCT Pub. No.: WO2021/244887
PCT Pub. Date: Dec. 9, 2021

(65) Prior Publication Data
US 2023/0217851 A1    Jul. 13, 2023

(30) Foreign Application Priority Data

Jun. 5, 2020 (DE) .......................... 102020114970.0

(51) Int. Cl.
*A01B 69/04* (2006.01)
*A01B 69/00* (2006.01)
*G05D 1/00* (2024.01)

(52) U.S. Cl.
CPC .......... *A01B 69/008* (2013.01); *A01B 69/001* (2013.01); *G05D 1/0246* (2013.01); *G05D 1/0278* (2013.01)

(58) Field of Classification Search
CPC ... A01B 69/008; A01B 69/001; A01B 1/0246; A01B 1/0278; G05D 1/0246; G05D 1/0278
(Continued)

(56) References Cited

U.S. PATENT DOCUMENTS 4,015,366 A  *  4/1977  Hall, III .................. A01G 3/04
                                                            193/25 E
6,198,992 B1 *  3/2001  Winslow ............... B60T 13/662
                                                            180/443
(Continued)

FOREIGN PATENT DOCUMENTS

CA           3010410 A1      2/2019
DE         19961442 A1      7/2001
(Continued)

OTHER PUBLICATIONS

Translation of International Search Report for PCT/EP2021/063782 mailed May 25, 2021.
(Continued)

*Primary Examiner* — Luis A Martinez Borrero
(74) *Attorney, Agent, or Firm* — Potomac Law Group, PLLC; John (Jack) Penny

(57) ABSTRACT

The invention relates to a method for cultivating row crops, comprising the following steps: sensor and satellite based recording of locations and/or courses of rows of plants while a first cultivation measure is carried out on a row crop by means of an agricultural plant cultivation device and controlling the movement and/or operation of an agricultural plant cultivation device while a second cultivation measure is carried out on the row crop based on the recorded locations and/or courses of the rows of plants.

16 Claims, 3 Drawing Sheets

(58) Field of Classification Search
USPC .......................................................... 701/50
See application file for complete search history.

(56) References Cited

U.S. PATENT DOCUMENTS

| | | | | |
|---|---|---|---|---|
| 6,314,348 | B1* | 11/2001 | Winslow | B62D 1/286 |
| | | | | 701/41 |
| 6,553,299 | B1* | 4/2003 | Keller | A01B 79/005 |
| | | | | 56/10.2 D |
| 9,002,566 | B2* | 4/2015 | McClure | A01B 69/008 |
| | | | | 701/28 |
| 10,149,468 | B2* | 12/2018 | Crinklaw | G05D 1/0274 |
| 11,132,003 | B2* | 9/2021 | Kreider | G05D 1/027 |
| 11,209,824 | B1* | 12/2021 | Kingman | B60W 30/09 |
| 11,238,283 | B2* | 2/2022 | Young | A01B 79/005 |
| 11,269,346 | B2* | 3/2022 | Madsen | G01S 19/45 |
| 11,703,880 | B2 | 7/2023 | Dima et al. | |
| 11,726,485 | B2* | 8/2023 | Tomita | G05D 1/00 |
| | | | | 701/50 |
| 11,765,542 | B2* | 9/2023 | Young | G05D 1/249 |
| | | | | 382/110 |
| 12,089,110 | B2* | 9/2024 | Young | H04W 4/38 |
| 12,108,696 | B2* | 10/2024 | Dix | G01C 21/16 |
| 2003/0187560 | A1 | 10/2003 | Keller et al. | |
| 2004/0186644 | A1* | 9/2004 | McClure | G05D 1/0278 |
| | | | | 701/41 |
| 2006/0150584 | A1* | 7/2006 | Weiss | A01B 69/008 |
| | | | | 54/10 |
| 2007/0271013 | A1 | 11/2007 | Jochem et al. | |
| 2008/0228360 | A1* | 9/2008 | Nelson | A01B 79/005 |
| | | | | 701/50 |
| 2009/0204281 | A1* | 8/2009 | McClure | G05D 1/027 |
| | | | | 701/25 |
| 2012/0010789 | A1* | 1/2012 | Dulnigg | A01G 23/08 |
| | | | | 701/50 |
| 2015/0163992 | A1* | 6/2015 | Anderson | A01C 21/005 |
| | | | | 701/50 |
| 2016/0041803 | A1* | 2/2016 | Markov | G06F 3/147 |
| | | | | 701/48 |
| 2016/0084813 | A1* | 3/2016 | Anderson | G01N 33/025 |
| | | | | 702/5 |
| 2017/0105331 | A1* | 4/2017 | Herlitzius | A01B 19/00 |
| 2018/0181143 | A1* | 6/2018 | Hiramatsu | G05D 1/0295 |
| 2018/0206393 | A1 | 7/2018 | Stoller et al. | |
| 2018/0210450 | A1 | 7/2018 | Ferrari et al. | |
| 2019/0059199 | A1 | 2/2019 | Stanhope | |
| 2019/0146511 | A1* | 5/2019 | Hurd | G06V 10/143 |
| | | | | 701/27 |
| 2019/0146513 | A1* | 5/2019 | Tomita | B60W 30/10 |
| | | | | 701/50 |
| 2020/0020093 | A1* | 1/2020 | Frei | G05D 1/24 |
| 2020/0029490 | A1* | 1/2020 | Bertucci | A01B 79/005 |
| 2020/0064144 | A1* | 2/2020 | Tomita | B62D 6/00 |
| 2020/0359542 | A1* | 11/2020 | Bögel | A01B 33/02 |
| 2021/0000006 | A1* | 1/2021 | Ellaboudy | A01B 69/001 |
| 2021/0103728 | A1* | 4/2021 | Young | G06V 20/56 |
| 2022/0132723 | A1* | 5/2022 | Anderson | B60W 60/0011 |
| | | | | 701/25 |
| 2022/0262112 | A1* | 8/2022 | Young | G06F 18/285 |
| 2024/0007822 | A1* | 1/2024 | Young | G06N 20/00 |

FOREIGN PATENT DOCUMENTS

| | | |
|---|---|---|
| DE | 102017110653 | 8/2018 |
| DE | 102017130694 A1 | 6/2019 |
| EP | 3482632 A1 | 5/2019 |
| EP | 3747248 A1 | 12/2020 |
| EP | 3756433 A1 | 12/2020 |
| WO | 2020037003 A1 | 2/2020 |

OTHER PUBLICATIONS https://www.researchgate.net/publication/328734357_Development_Of_A_Mach in_E_ Vision_System—For_Real-Tim E_M Easu Rem Ent_ of _Seed_Spacing_An D_Seeding_Depth_Of Corn (Year: 2018).
T2 and T3 Terrain Compensation Technology Factsheet.pdf (Year: 2018).
Trimble Autopilot (Year: 2019).
U.S. Non-Final Office Action for U.S. Appl. No. 18/007,883 dated Oct. 28, 2024.
Non-Final Office Action for U.S. Appl. No. 18/007,883 dated Apr. 1, 2025.
Final Office Action for U.S. Appl. No. 18/007,883 mailed on Oct. 16, 2025.
Notice of Opposition for European Patent No. EP4161241B mailed on Sep. 9, 2025.

* cited by examiner

METHOD FOR CULTIVATING ROW CROPS

RELATED APPLICATIONS

This application is a 35 U.S.C. 371 national stage filing of International Application No. PCT/EP2021/063782, filed on May 25, 2021, which claims priority to German Application No. DE 102020114970.0, filed on Jun. 5, 2020, the contents of which are hereby incorporated by reference.

The invention relates to a method for cultivating row crops according to the preamble of claim 1, an agricultural plant cultivation device for row crops according to the preamble of claim 12 and a cultivation system for row crops according to the preamble of claim 15.

When cultivating row crops, the result of the cultivation measure carried out depends to a considerable extent on precise row detection. For this reason, modern plant cultivation devices, such as agricultural hoeing devices, are regularly equipped with a row detection device by means of which the positions and courses of rows of plants can be determined while cultivation measures are carried out on row crops.

The recording of the positions and courses of rows of plants while cultivation measures are carried out on a row crop can be carried out with the help of sensors and a satellite. In addition to the recording of rows of plants with the help of sensors and a satellite, an application of seeds with the help of a satellite is known, for example, from DE 10 2005 010 686 A1, so that position and course information on the rows of plants is already available before the plants emerge on the agricultural land. In this way, the row course can be determined without the plants having to be visible on the soil surface.

The seed position information recorded during the sowing process can then be used when subsequently carrying out cultivation measures on the plant stand. From the publications DE 10 2017 126 222 A1 and U.S. Pat. No. 6,199,000 B1, for example, the targeted local application of plant protection products to harmful growth is known, wherein the harmful growth is detected taking into account seed position information and measurement data from spectral sensors or chlorophyll detectors.

In practice, however, corresponding seed position information recorded during seed application is often not available. For this reason, the movement and/or operation of the agricultural plant cultivation device while a cultivation measure is carried out are often controlled based on row information, which is determined by the plant cultivation device itself while the cultivation measures are carried out. Here, the positions and/or courses of rows of plants are determined, for example, based on a camera by the plant cultivation device.

In this context, however, there is an issue in that wind-induced plant movements, heavy weediness, a leaf canopy that has already formed and row closure can cause problems and lead to incorrect detection of row positions and/or courses. Incorrectly detected or imprecisely recorded row courses cannot be identified due to the lack of a suitable reference data set, the cultivation measure carried out on the row crop being imprecise and consequently not leading to satisfactory results.

Particularly in the case of high-mass and tall plants, such as corn plants, the detection of the course of the rows of plants is often so imprecise that row-guided cultivation measures result in a considerable loss of yield.

The object of the invention is thus to improve the precision in the execution of row-guided cultivation measures.

The object is solved by a method of the type mentioned at the beginning, wherein, within the scope of the method according to the invention, the movement and/or operation of an agricultural plant cultivation device while the second cultivation measure is carried out on the row crop are controlled based on the recorded locations and/or courses of the rows of plants.

The invention makes use of the knowledge that the positions and courses of rows of plants do not change during the growth phase of the plant stand. Thus, a sensor and satellite based recording of positions and/or courses of rows of plants can be carried out while a first cultivation measure is carried out on the row crop, wherein the plants at this time only perform minor wind-induced plant movements and have not yet formed a pronounced leaf canopy. The positions and courses of rows of plants with comparatively young plants can be determined much more precisely than the positions and courses of rows of plants with older plants, which perform wind-induced movements due to their growth height and already have a pronounced leaf canopy. These positions and/or courses of the rows of plants recorded during a first cultivation measure on the row crop can then be used to precisely control the movement and/or operation of the agricultural plant cultivation device used while a second cultivation measure is carried out on the row crop.

While the first cultivation measure is carried out on the row crop, georeferencing data of the rows of plants are recorded, based on which the second cultivation measure is then carried out on the row crop. By reusing the georeferencing data, sensor-based, e.g. camera-based, row detection is no longer mandatory while the second cultivation measure is carried out, the result of the second cultivation measure being no longer or less intensively affected by wind-induced plant movements, heavy weediness, a leaf canopy that has already formed or row closure.

When controlling the movement and/or operation of the agricultural cultivation device while the second cultivation measure is carried out on the row crop, the sensor and/or satellite based determination of positions and/or courses of rows of plants can be omitted completely. Alternatively, when controlling the movement and/or operation of the agricultural plant cultivation device while the second cultivation measure is carried out on the row crop, positions and/or courses of rows of plants can also be taken into account, which are determined with the help of sensors and/or a satellite while the second cultivation measure is carried out.

If the control of the movement and/or operation of the agricultural plant cultivation device while the second cultivation measure is carried out on the row crop is based on both georeferencing data recorded while the first cultivation measure is carried out and georeferencing and/or sensor data obtained while the second cultivation measure is carried out, the georeferencing and/or sensor data may be weighted. The weighting can be based, for example, on detection difficulties while recording. If the recorded position and/or course data indicate that there were significant detection difficulties while recording, a comparatively low weighting factor can be assigned to these data. If the position and/or course data indicate that there were no or only minor detection difficulties while recording, a comparatively high weighting factor can be assigned to these data. When controlling the movement and/or operation of the agricultural plant cultivation device while the second cultivation measure is carried out, the data is then taken into account more or less according to their weighting factor. When weighting the georeferencing and/or sensor data, the use of data from a single sensor or several individual sensors can also be excluded. This may be the case, for example, if the detection difficulties while recording data were outside an acceptable tolerance range, so that a reliable row detection is no longer possible on the basis of the recorded data.

While the first cultivation measure is carried out on the row crop, the agricultural plant cultivation device is preferably controlled in a row-guided manner. By controlling the movement of the agricultural plant cultivation device while the second cultivation measure is carried out on the row crop, row guidance is preferably also implemented. Before and/or between the first and the second cultivation measure, one or more further cultivation measures can be carried out on the row crop. The second cultivation measure therefore does not have to follow directly after the first cultivation measure.

The second cultivation measure is carried out with a time lag after the first cultivation measure. There may be several days, weeks or months between carrying out the first cultivation measure and carrying out the second cultivation measure.

In a preferred embodiment of the method according to the invention, the first cultivation measure and the second cultivation measure are carried out with the same agricultural plant cultivation device. Preferably, the first cultivation measure and the second cultivation measure concern the same processing operation. Preferably, the first cultivation measure and the second cultivation measure are carried out with an agricultural hoeing device, wherein the first cultivation measure and the second cultivation measure concern a hoeing operation. Alternatively, the first cultivation measure and the second cultivation measure are carried out with an agricultural spraying device, wherein the first cultivation measure and the second cultivation measure concern a spraying operation. Alternatively, the first cultivation measure and the second cultivation measure may be carried out with different or varying agricultural plant cultivation devices. Different plant cultivation devices are plant cultivation devices of the same type, for example two different hoeing devices or two different spraying devices. Varying plant cultivation devices vary in terms of their device type, so that, for example, the first cultivation measure is carried out with a hoeing device and the second cultivation measure with a spraying device.

In a further preferred embodiment of the method according to the invention, one or more optical sensors of the agricultural plant cultivation device are used to record the positions and/or courses of the rows of plants while the first cultivation measure is carried out. The one or more optical sensors can each be components of a camera. The recording of the positions and/or courses of the rows of plants is preferably carried out with the help of a camera. The agricultural plant cultivation device used to carry out the first cultivation measure on the row crop preferably includes one or more cameras. Alternatively or additionally, the recording of the positions and/or courses of the rows of plants while the first cultivation measure is carried out can also be carried out by means of one or more non-contact distance sensors. The position and/or course recording can also be done with one or more ultrasonic sensors, one or more sensing wheels and/or one or more row sensors. The one or more sensing wheels can, for example, detect a furrow that has been made in the soil of the agricultural land during the sowing process. The use of row sensors requires a certain plant stability, so that their use is appropriate when the plants have reached a certain minimum age or size.

If positions and/or courses of rows of plants are also detected while the second cultivation measure is carried out, this can be done in the ways described above.

In another preferred embodiment of the method according to the invention the control of the movement of the agricultural plant cultivation device while a second cultivation measure is carried out on the row crop is carried out without taking into account measured values of optical sensors of the agricultural plant cultivation device. Preferably, when controlling the movement of the agricultural plant cultivation device while the second cultivation measure is carried out on the row crop, no measured values of optical sensors of a drive vehicle to which the plant cultivation device is attached are taken into account either. Preferably, while the second cultivation measure is carried out, there is no separate row detection in relation to the row crop to be worked. Thus, while the second cultivation measure is carried out, a plant cultivation device can also be used which does not have cameras or sensors for row detection.

In another preferred embodiment of the method according to the invention, a receiving unit for satellite signals of the agricultural plant cultivation device is used to record the positions and/or courses of the rows of plants while the first cultivation measure is carried out. The receiving unit can be a GPS receiver. When recording the positions and/or courses of the rows of plants while the first cultivation measure is carried out, a RTK (Real Time Kinematic) survey can be carried out. Preferably, when recording the positions and/or courses of the rows of plants while the first cultivation measure is carried out, in addition to the GPS signals and the measured sensor values of the one or more sensors, the dimensions of the plant cultivation device used and/or the relative position or positions between the receiving unit for satellite signals and the one or more sensors of the row detection device are also taken into account. Based on the signals from the receiving unit for satellite signals, the measured sensor values from the one or more sensors and the relative position or positions between the receiving unit for satellite signals and the one or more sensors, the row detection device can determine the positions and/or courses of the rows of plants and the determined row information can be stored in a georeferenced manner. The stored georeferenced row information thus concerns the actual row courses and/or positions and is independent of the plant cultivation device with which it was recorded. The stored georeferenced row information can therefore also be used by another plant cultivation device to carry out the second cultivation measure. Furthermore, the stored georeferenced row information can also be retrieved and used by other devices and machines.

In a further embodiment of the method according to the invention, the agricultural plant cultivation device is carried, pulled or pushed by an agricultural drive vehicle while the second cultivation measure is carried out on the row crop. The control of the movement of the agricultural plant cultivation device while the second cultivation measure is carried out on the row crop is effected via the control of a steering movement of the agricultural drive vehicle. For this purpose, for example, the agricultural plant cultivation device may generate steering commands for the drive vehicle and transmit them to the drive vehicle so that the drive vehicle can convert the steering commands into a steering movement. When generating the steering commands, the geometric dimensions of the device combination of plant cultivation device and drive vehicle are preferably taken into account. In particular, the steering characteristics of the drive vehicle and/or the plant cultivation device and/or the positions of the sensors of the plant cultivation device are taken into account when generating the steering commands. Alternatively, the agricultural plant cultivation device used to carry out the second cultivation measure on the row crop can be a self-propelled plant cultivation device. In this case the control of the movement of the agricultural plant cultivation device while the second cultivation measure is carried out is effected via the control of the steering movement of the agricultural plant cultivation device. The agricultural plant cultivation device in this case can be, for example, a self-propelled plant protection sprayer.

In another embodiment of the method according to the invention, in order to control the movement of the agricultural plant cultivation device, steering commands for the drive vehicle are generated based on the recorded positions and/or courses of the rows of plants and transmitted to a steering control of the drive vehicle. The steering control of the drive vehicle preferably initiates a row-related guidance of the plant cultivation device based on the transmitted steering commands. The transmission of the generated steering commands from the plant cultivation device to the drive vehicle can be wireless or wired.

It is further advantageous to provide a method according to the invention, wherein the control of the operation of the agricultural plant cultivation device while the second cultivation measure is carried out on the row crop comprises a positioning and/or aligning of one or more cultivation tools. The one or more cultivation tools may be attached to one or more cross members of the agricultural plant cultivation device and may be arranged side by side and spaced apart in transverse direction, i.e. transversely to the direction of travel. The one or more cultivation tools can be positioned and/or aligned manually and/or by means of a positioning and/or alignment drive. The one or more positioning and/or alignment drives can be pneumatic, hydraulic and/or electric drives. The cultivation tools are preferably hoeing tools. During positioning, the one or more cultivation tools can be moved transversely to the direction of travel, for example in order to precisely set the intended relative positioning according to the detected rows of plants. When aligning, the one or more cultivation tools can be swiveled, for example.

In a further preferred embodiment of the method according to the invention the control of the operation of the agricultural plant cultivation device while a second cultivation measure is carried out on the row crop comprises positioning, aligning, activating and/or deactivating individual discharge nozzles. The discharge nozzles are preferably spray nozzles for a spray liquid. When positioning a discharge nozzle, the position of the discharge nozzle is preferably changed in relation to a linkage. When aligning a discharge nozzle, the angle of attack of the discharge nozzle is preferably changed in relation to a reference plane, for example the ground of the agricultural land or a horizontal or vertical plane, or in relation to a sprayer linkage. The discharge nozzles can, for example, be positioned and/or aligned manually or via a positioning and/or alignment drive. The one or more positioning and/or alignment drives can be pneumatic, hydraulic, or electric drives. By positioning and/or aligning discharge nozzles, the spray cone can be positioned and/or aligned in an intended manner in relation to the crop rows. By activating and deactivating individual discharge nozzles, for example, a row switching can be implemented so that the discharge of spray liquid can be temporarily interrupted segment by segment.

In a further preferred embodiment of the method according to the invention, the first cultivation measure and/or the second cultivation measure concern a hoeing operation in which mechanical soil cultivation takes place. The plant cultivation device used to carry out the first cultivation measure and/or the second cultivation measure is preferably an agricultural hoeing device. The hoeing device is preferably attached to a front coupling device or to a rear coupling device of the drive vehicle.

It is further advantageous to provide a method according to the invention, wherein the first cultivation measure and/or the second cultivation measure concern a spraying operation in which spray liquid is discharged. The plant cultivation device used to carry out the first cultivation measure and/or the second cultivation measure is preferably an agricultural sprayer, in particular a field sprayer.

The object of the invention is further solved by an agricultural plant cultivation device of the type mentioned at the beginning, wherein the agricultural plant cultivation device includes a control device which is configured to control the operation of the agricultural plant cultivation device while the second cultivation measure is carried out on the row crop based on the recorded locations and/or courses of the rows of plants and/or to cause a control of the movement of the agricultural plant cultivation device while the second cultivation measure is carried out on the row crop based on the recorded locations and/or courses of the rows of plants. The plant cultivation device is preferably configured to perform a method for cultivating row crops according to the embodiments described above. With regard to the advantages and modifications of the plant cultivation device according to the invention, reference is made to the advantages and modifications of the method for cultivating row crops according to the invention.

In a preferred embodiment of the agricultural plant cultivation device according to the invention, the row detection device comprises one or more optical sensors and/or a receiving unit for satellite signals. The one or more optical sensors may be components of one or more cameras. Alternatively, the sensors can also be sensors for non-contact distance measurement. For example, the sensors of the row detection device are configured as ultrasonic sensors. The receiving unit can be a GPS receiver.

In a further preferred embodiment of the agricultural plant cultivation device according to the invention, the latter is configured to be carried, pulled or pushed by an agricultural drive vehicle while the second cultivation measure is carried out on the row crop, wherein the control device of the agricultural plant cultivation device is preferably configured to generate steering commands for the drive vehicle based on the recorded positions and/or courses of the rows of plants and transmit them to a steering control of the drive vehicle. Preferably, the agricultural plant cultivation device is configured to form a Tractor Implement Management (TIM) system with the drive vehicle.

The object of the invention is further solved by a cultivation system of the type mentioned above, wherein the cultivation system according to the invention is configured to perform the method for cultivating row crops according to one of the embodiments described above. With regard to the advantages and modifications of the cultivation system according to the invention, reference is made to the advantages and modifications of the method for cultivating row crops according to the invention.

In the following, preferred embodiments of the invention are explained and described in more detail with reference to the accompanying drawings, in which.

Figure 1:
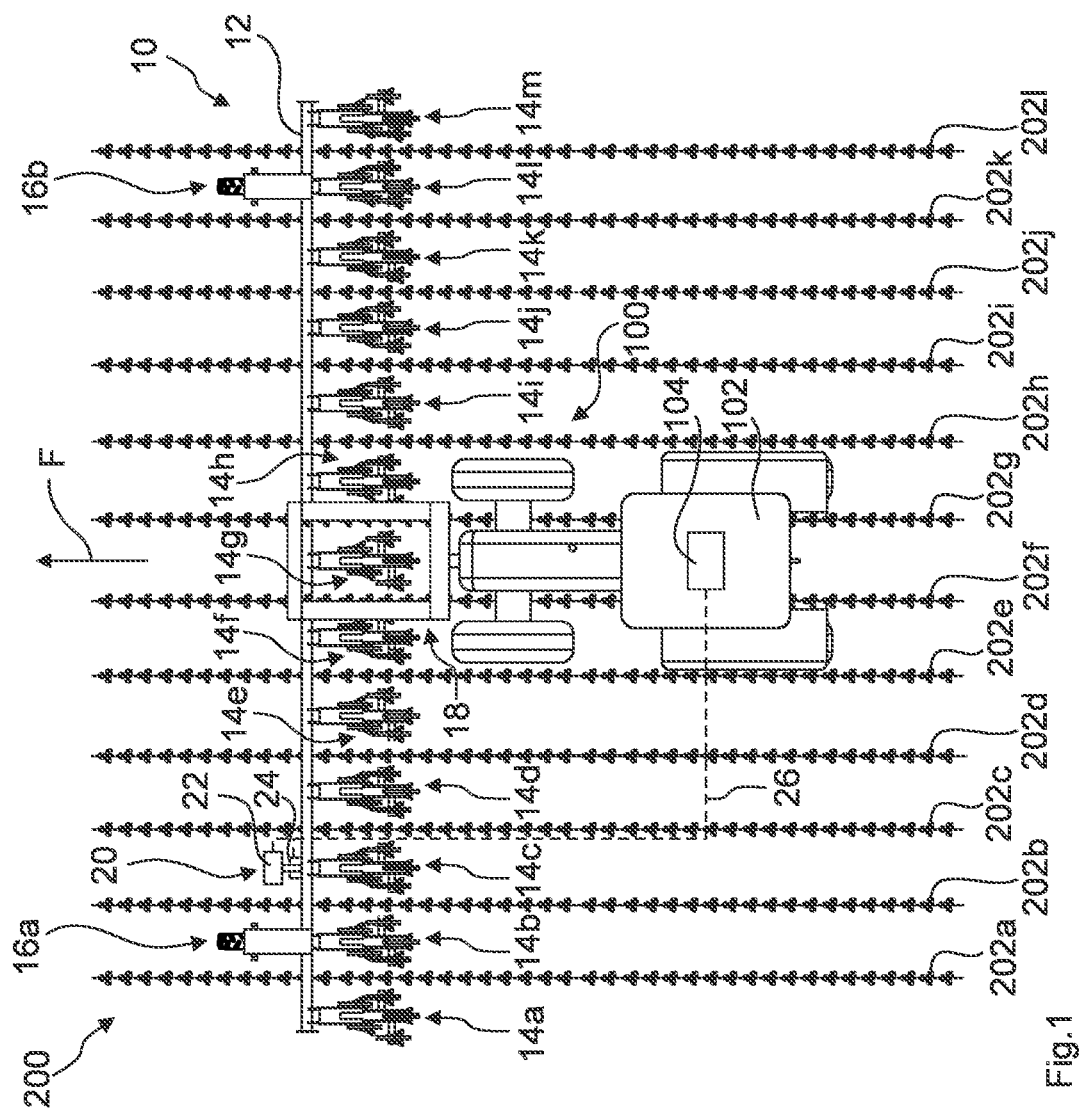
FIG. 1 shows a schematic top view of a cultivation system according to the invention while a first cultivation measure is carried out on a row crop.
Figure 2:
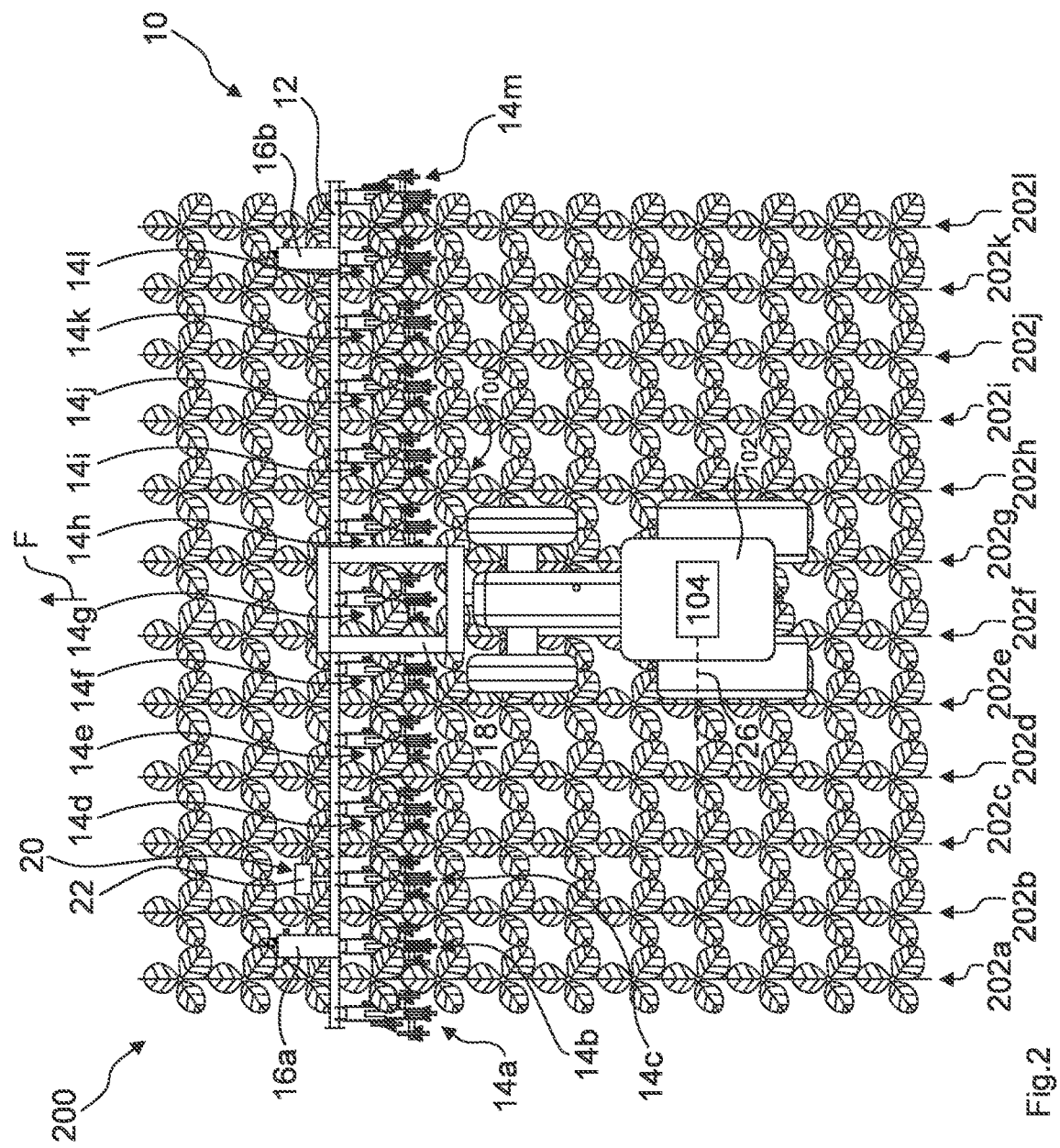
FIG. 2 shows a schematic top view of the cultivation system shown in FIG. 1 while a second cultivation measure is carried out on the same row crop.

FIGS. 1 and 2 show a cultivation system 100 comprising a drive vehicle 102 and a plant cultivation device 10. The drive vehicle 102 is configured as a tractor, wherein the plant cultivation device 10, which is configured an agricultural hoeing device, is attached to a front device mount of the drive vehicle 102 via a coupling device 18.

The plant cultivation device 10 has a cross member 12 extending transversely to the direction of travel F, wherein a plurality of cultivation tools 14a-14m in the form of hoeing tools is attached to the cross member 12. The cultivation tools 14a-14m are arranged side by side and spaced apart in the transverse direction. The cross member 12 is supported relative to the ground of an agricultural area via the wheels 16a, 16b of the plant cultivation device 10.

A row crop 200 is arranged on the agricultural land, the row crop 200 having a plurality of parallel rows of plants 202a-202l.

The agricultural plant cultivation device 10 has a row detection device 20, by means of which the positions and courses of the rows of plants 202a-202l can be recorded with the help of sensors and satellites while cultivation measures are carried out on the row crop 200. For this purpose, the row detection device 20 has a receiver unit for satellite signals, by which GPS data can be recorded while cultivation measures are carried out on the row crop 200. The receiving unit is thus a GPS receiver. The row detection device 20 includes further a camera 22 and a sensor 24. The camera 22 is oriented in the direction of travel F and comprises an image sensor so that image recordings of the rows of plants 202a-202l can be generated while cultivation measures are carried out on the row crop 200. The sensor 24 is a non-contact distance sensor, by which the distance of the sensor 24 to the rows of plants 202a-202l can be determined. The recording of the positions and courses of the rows of plants 202a-202l is thus performed with the help of sensors and a satellite.

Taking into account the relative position between the receiving unit for satellite signals and the camera 22, and the relative position between the receiving unit for satellite signals and the sensor 24, the row detection device 20 can record georeferencing data of the rows of plants 202a-202l while cultivation measures are carried out.

A control device of the plant cultivation device 10 is connected to a steering control 104 of the drive vehicle 102 via a data connection 26. By means of the control device of the plant cultivation device 10, the operation of the plant cultivation device 10 can be controlled automatically based on the row information while a cultivation measure is carried out. Furthermore, the control of the plant cultivation device 10 can cause steering movements to be carried out on the drive vehicle 102 via steering commands which are transmitted to the steering control system 104 of the drive vehicle 102 via the data connection 26. The data connection 26 can be a wireless or wired data connection.

In the situation shown in FIG. 1, a first cultivation measure is carried out on the row crop 200 by means of the plant cultivation device 10. The plants of the row crop 200 are comparatively young and small, so that the plants only perform minor wind-induced movements. Furthermore, the plants do not yet have a pronounced leaf canopy. In addition, there is only insignificant weediness on the agricultural land. Due to the state of the plants, a comparatively precise recording of the positions and courses of the rows of plants 202a-202l can be made with the help of sensors and a satellite while the first cultivation measure is carried out. The georeferencing data obtained when recording the positions and courses of the rows of plants 202a-202l can be used for row guidance while a second cultivation measure is carried out on the row crop 200 later.

FIG. 2 shows the cultivation system 100 comprising the plant cultivation device 10 and the drive vehicle 102 while a second cultivation measure is carried out on the row crop 200. Due to the advanced plant growth, the plants of the row crop 200 now have a pronounced leaf canopy. Furthermore, the wind acting on the row crop 200 causes wind-induced plant movements due to the advanced growth height of the plants. In addition, weeding of the soil of the agricultural land has taken place. In the present situation, the determination of the positions and courses of the rows of plants 202a-202l with the help of sensors is only possible to a limited extent. Due to the detection difficulties, there can be considerable inaccuracies in the position and course detection.

In order to minimize the influence of false detection of the rows of plants 202a-202l, the control of the movement and operation of the agricultural plant cultivation device 10 while the second cultivation measure is carried out on the row crop 200 is performed according to the positions and courses of the rows of plants 202a-202l recorded while the first cultivation measure was carried out on the row crop 200. While the second cultivation measure is carried out, measured data of the row detection device 20, which are recorded while the second cultivation measure is carried out, can also be taken into account. However, the use of the camera 22 or the sensor 24 is not mandatory based on the available data from the first cultivation measure. If the control of the movement and operation of the agricultural plant cultivation device 10 while the second cultivation measure is carried out on the row crop is based on both georeferencing data recorded while the first cultivation measure is carried out and sensor data obtained while the second cultivation measure is carried out, the georeferencing and/or sensor data may be weighted. The weighting can be based, for example, on the detection difficulties while recording.

Figure 3:
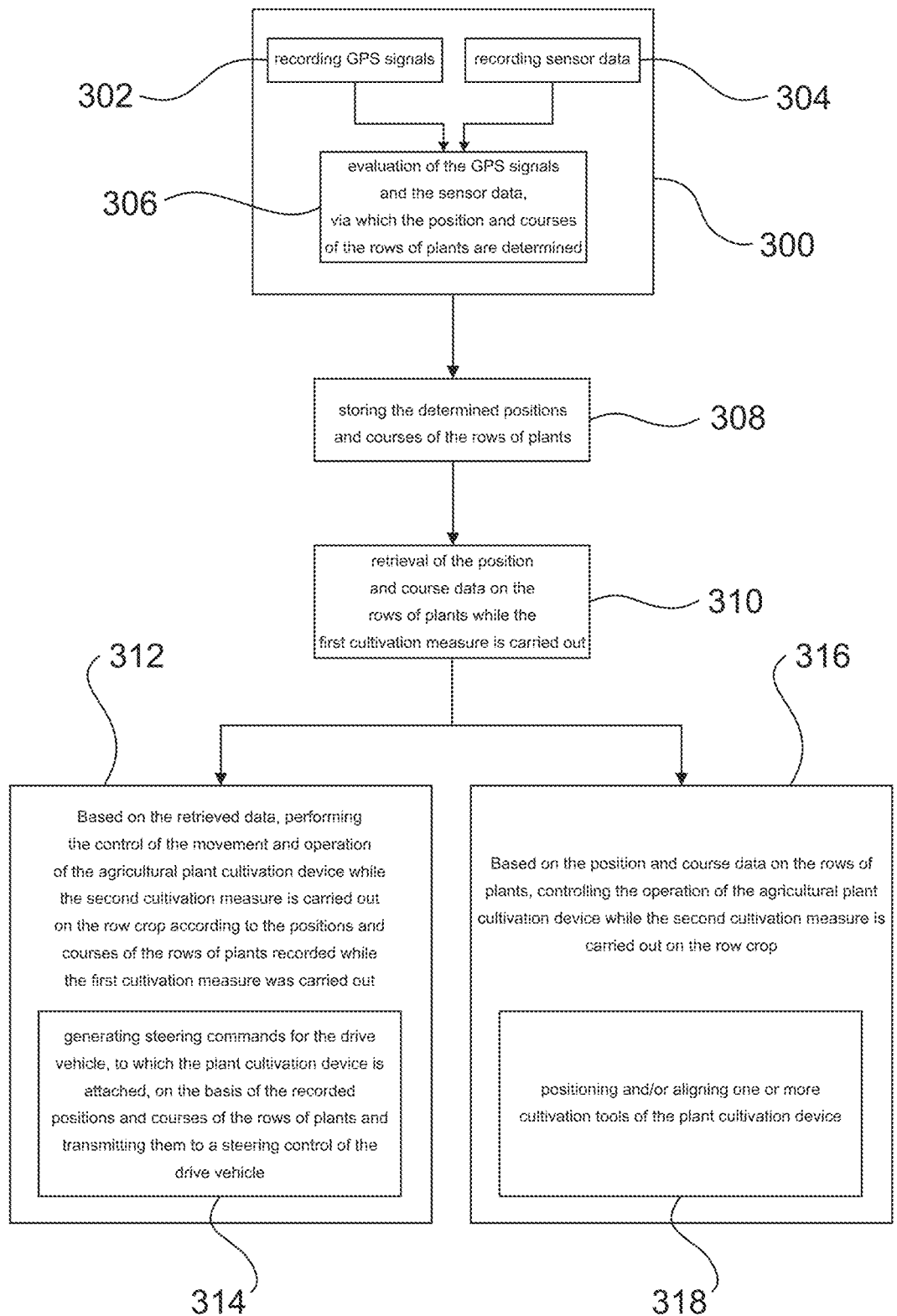
FIG. 3 shows the sequence of a method for cultivating row crops according to the invention in a block diagram.

FIG. 3 shows an example of a method for cultivating row crops 200.

In step 300, a sensor and satellite based recording of locations and courses of rows of plants 202a-202l while a first cultivation measure is carried out on a row crop 200 is performed by means of an agricultural plant cultivation device 10. The sensor and satellite based recording comprises recording GPS signals (method step 302) and recording sensor data (method step 304). The sensor data can, for example, be recorded with an image sensor of a camera or a non-contact distance sensor. Taking into account the positions of the GPS receiver and the sensors, an evaluation of the GPS signals and the sensor data is then carried out in method step 306, via which the positions and courses of the rows of plants 202a-202l are determined.

The determined positions and courses of the rows of plants 202a-202l are then stored in method step 308. The data can be stored, for example, in an internal memory of the plant cultivation device 10. Alternatively or additionally, the data can also be stored in an external database. For this purpose, it may be necessary to send the position and course data on the rows of plants 202a-202l to the external database via radio and/or using the internet.

The method step 310 is already assigned to the second cultivation measure and concerns the retrieval of the position and course data on the rows of plants 202a-202l recorded while the first cultivation measure is carried out by the plant cultivation device 10 used for the second cultivation measure. However, the position and course data on the rows of plants 202a-202l recorded while the first cultivation measure is carried out can also be retrieved and used by other devices or machines. Based on the retrieved data, the control of the movement and operation of the agricultural plant cultivation device 10 while the second cultivation measure is carried out on the row crop 200 is performed in method step 312 according to the positions and courses of the rows of plants 202a-202l recorded while the first cultivation measure was carried out. To control the movement of the agricultural plant cultivation device 10, steering commands for the drive vehicle 102, to which the plant cultivation device 10 is attached, are generated on the basis of the recorded positions and courses of the rows of plants and transmitted to a steering control of the drive vehicle 102 (method step 314).

Based on the position and course data on the rows of plants 202a-202l, the operation of the agricultural plant cultivation device 10 can also be controlled while the second cultivation measure is carried out on the row crop 200 (method step 316). Controlling the operation of the plant cultivation device while the second cultivation measure is carried on the row crop 200 may comprise, for example, positioning and/or aligning one or more cultivation tools 14a-14m of the plant cultivation device (method step 318). For example, individual or all of the cultivation tools 14a-14m may be moved transversely to the direction of travel F so that an intended relative position to the rows of plants 202a-202l is set. Alternatively or additionally, the cultivation tools 14a-14m may be inclined or pivoted to create an intended relative alignment to the rows of plants 202a-202l.

Alternatively or in addition to the cultivation tools 14a-14m, the plant cultivation device 10 may comprise discharge nozzles for a spray liquid. In this case, the method step 318 could concern, for example, positioning, aligning, activating or deactivating individual discharge nozzles depending on the positions and courses of the rows of plants 202a-202l of the row crop 200 recorded while the first cultivation measures are carried out.

REFERENCE SIGNS LIST

10 Plant cultivation device
12 Cross member
14a-14m Cultivation tools
16a, 16b Wheels
18 Coupling device
20 Row detection device
22 Camera
24 Sensor
26 Data connection
100 Cultivation system
102 Drive vehicle
104 Steering control
200 Row crop
202a-202l Rows of plants
300-318 Method steps
F Direction of travel

The invention claimed is:

1. A method for cultivating row crops, comprising:
using sensor and satellite data to record locations and/or courses of rows of plants while a first cultivation measure is carried out on a row crop by an agricultural plant cultivation device; and
controlling the movement and/or operation of the agricultural plant cultivation device while a second cultivation measure is carried out on the row crop based on the recorded locations and/or courses of the rows of plants from the first cultivation measure, wherein the control of the movement and/or operation of the agricultural plant cultivation device while the second cultivation measure is carried out on the row crop is based on both georeferencing data recorded while the first cultivation measure is carried out and georeferencing and/or sensor data obtained while the second cultivation measure is carried out, wherein the georeferencing and/or sensor data is weighted based on detection difficulties while recording.

2. The method of claim 1, wherein the first cultivation measure and the second cultivation measure are carried out with the same agricultural plant cultivation device.

3. The method of claim 1, wherein one or more optical sensors of the agricultural plant cultivation device are used for recording the positions and/or courses of the rows of plants while the first cultivation measure is carried out.

4. The method of claim 1, wherein the control of the movement of the agricultural plant cultivation device while the second cultivation measure is carried out on the row crop is carried out without taking into account measured values of optical sensors of the agricultural plant cultivation device.

5. The method of claim 1, wherein a receiving unit for satellite signals of the agricultural plant cultivation device is used for recording the positions and/or courses of the rows of plants while the first cultivation measure is carried out.

6. The method of claim 1, wherein the agricultural plant cultivation device is carried, pulled or pushed by an agricultural drive vehicle while the second cultivation measure is carried out on the row crop and the control of the movement of the agricultural plant cultivation device while the second cultivation measure is carried out on the row crop is effected via the control of a steering movement of the agricultural drive vehicle.

7. The method of claim 1, wherein in order to control the movement of the agricultural plant cultivation device, steering commands for the drive vehicle are generated based on the recorded positions and/or courses of the rows of plants and transmitted to a steering control of the drive vehicle.

8. The method of claim 1, wherein the control of the operation of the agricultural plant cultivation device while the second cultivation measure is carried out on the row crop comprises a positioning and/or aligning of one or more cultivation tools.

9. The method of claim 1, wherein the first cultivation measure and/or the second cultivation measure relate to a hoeing operation in which mechanical soil cultivation takes place.

10. The method of claim 1, wherein the first cultivation measure and/or the second cultivation measure relate to a spraying operation in which spray liquid is applied.

11. The method of claim 10, wherein the control of the operation of the agricultural plant cultivation device while the second cultivation measure is carried out on the row crop comprises positioning, aligning, activating and/or deactivating individual discharge nozzles.

12. A cultivation system for row crops, with an agricultural plant cultivation device; and
an agricultural drive vehicle to which the agricultural plant cultivation device is attached;

wherein the cultivation system is configured to perform the method for cultivating row crops according to claim 1.

13. The method of claim 1, wherein the movement and/or operation of the agricultural plant cultivation device is controlled without using sensor or satellite data to record locations and/or courses of rows of plants.

14. An agricultural plant cultivation device for row crops, comprising:
   a row detection device which is configured to record, in a sensor and satellite based way, locations and/or courses of rows of plants while a first cultivation measure is carried out on a row crop; and
   control device which is configured to control the operation of the agricultural plant cultivation device while a second cultivation measure is carried out on the row crop based on the recorded locations and/or courses of the rows of plants from the first cultivation measure or configured to cause a control of the movement of the agricultural plant cultivation device while the second cultivation measure is carried out on the row crop based on the recorded locations and/or courses of the rows of plants from the first cultivation measure, wherein the control of the movement and/or operation of the agricultural plant cultivation device while the second cultivation measure is carried out on the row crop is based on both georeferencing data recorded while the first cultivation measure is carried out and georeferencing and/or sensor data obtained while the second cultivation measure is carried out, wherein the georeferencing and/or sensor data is weighted based on detection difficulties while recording.

15. The agricultural plant cultivation device of claim 14, wherein the row detection device comprises one or more optical sensors and/or a receiving unit for satellite signals.

16. The agricultural plant cultivation device of claim 14, wherein the agricultural plant cultivation device is configured to be carried, pulled or pushed by an agricultural drive vehicle while the second cultivation measure is carried out on the row crop, wherein the control device of the agricultural plant cultivation device is preferably configured to generate steering commands for the drive vehicle based on the recorded positions and/or courses of the rows of plants and transmit them to a steering control of the drive vehicle.

* * * * *